United States Patent [19]

Hampe et al.

[11] Patent Number: 5,380,604
[45] Date of Patent: Jan. 10, 1995

[54] LEAD ACCUMULATOR

[75] Inventors: Werner Hampe, Marsberg; Peter Scholz, Brilon, both of Germany

[73] Assignee: Accumulatorenwerke Hoppecke Carl Zoellner & Sohn GmbH & Co. KG, Briton, Germany

[21] Appl. No.: 96,781

[22] Filed: Jul. 23, 1993

[30] Foreign Application Priority Data

Jul. 24, 1992 [DE] Germany .................. 9209987[U]

[51] Int. Cl.⁶ .................. H01M 2/12; H01M 2/04
[52] U.S. Cl. .................................. 429/84; 429/86; 429/88
[58] Field of Search .................. 429/84, 88, 87, 86, 429/72

[56] References Cited

U.S. PATENT DOCUMENTS

| | | | |
|---|---|---|---|
| 3,879,227 | 4/1975 | Hennen | 429/88 X |
| 4,348,466 | 9/1982 | Elehew et al. | |
| 4,600,664 | 7/1986 | Cramer et al. | 429/88 X |
| 4,851,305 | 7/1989 | Kump et al. | |
| 4,891,270 | 1/1990 | Jergi et al. | 429/88 X |
| 4,916,034 | 4/1990 | Hulsebus et al. | 429/88 X |

FOREIGN PATENT DOCUMENTS

| | | |
|---|---|---|
| 0462403 | 12/1991 | European Pat. Off. |
| 0523273 | 1/1993 | European Pat. Off. |
| 7931523 | 6/1981 | France . |
| 8007719 | 7/1980 | Germany . |
| 8430246 | 10/1984 | Germany . |
| 9102838 | 8/1992 | Germany . |
| 9209987 | 10/1992 | Germany . |
| 60-081762 | 9/1985 | Japan . |

Primary Examiner—John S. Maples
Attorney, Agent, or Firm—Robert W. Becker & Associates

[57] ABSTRACT

A lead accumulator has a housing with a frontside, a backside, a first and a second end faces, and a bottom. The housing has a plurality of cells containing acid. A lid is provided for closing the housing. The lid comprises an upper lid and a lower lid spaced from the upper lid to define a space therebetween. The space is divided by chamber walls into a plurality of chambers such that each cell has a corresponding chamber within the lid. For each cell the lid has a fill and check opening closable by a stopper. Each chamber has guides for controlling the flow of acid. The guides comprise deflecting stays and an annular stay surrounding the fill and check opening, the annular stay having a degassing and return outlet. The lid further has at least one ignition protector. The guides are designed and arranged such that, in any position of the housing, when resting on one of the side walls, acid within the chambers remains below a level above which acid flows into the ignition protector.

10 Claims, 4 Drawing Sheets (VIII - VIII)

(IX - IX)

LEAD ACCUMULATOR

BACKGROUND OF THE INVENTION

The present invention relates to a lead accumulator having a housing with a plurality of cells and a lid closing off the housing. The lid is comprised of a lower lid and an upper lid spaced apart from one another whereby in the space between the upper lid and the lower lid a plurality of chambers corresponding to the cells in the housing is provided. The chambers have guides for precipitating acid whereby the lid is furthermore provided with a fill and check opening for each cell that is closable by a stopper. The fill and check opening is surrounded by an annular stay having a degassing and return outlet. The accumulator has at least one ignition protector within the lid.

A lead accumulator of this type is known from German Gebrauchsmuster 84 30 246. The known accumulator has a housing, made of thermoplastic material, with a plurality of cells therein. The housing is closed off by a lid which is in the form of a so-called block lid in which between an upper lid portion and a spaced apart lower lid portion a chamber is provided for each cell. In these chambers deflecting guides for the precipitation of acid are provided. Each cell is provided with a filling opening within the lid which may further serve as a check opening. These fill and check openings are closable with stoppers. Within the chamber, the fill and check openings are surrounded by an annular stay which has a degassing and return outlet whereby this annular stay together with the deflecting guides provide the labyrinth for the acid precipitation. Furthermore, the accumulator has an ignition protector within the lid.

A disadvantage of the known lead accumulator is that when turning the housing by 90°, i.e., when the housing rests on one of its four sidewalls, depending on position and length of the turning the chambers may fill with acid which may result in the acid entering the ignition protector and flowing from there via the gas release channel to the outside. When the ignition protector has been wetted once, acid will always leak. This must be prevented in vehicles for safety reasons, especially when the lead accumulator is used as the starter battery in motorized vehicles.

It is therefore an object of the present invention to improve a lead accumulator such that in a turned position for a limited time, for example, within 20 hours when resting on one of its sidewalls and within one hour when being tilted, no acid is able to reach the ignition protector or is able to leak from the battery.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
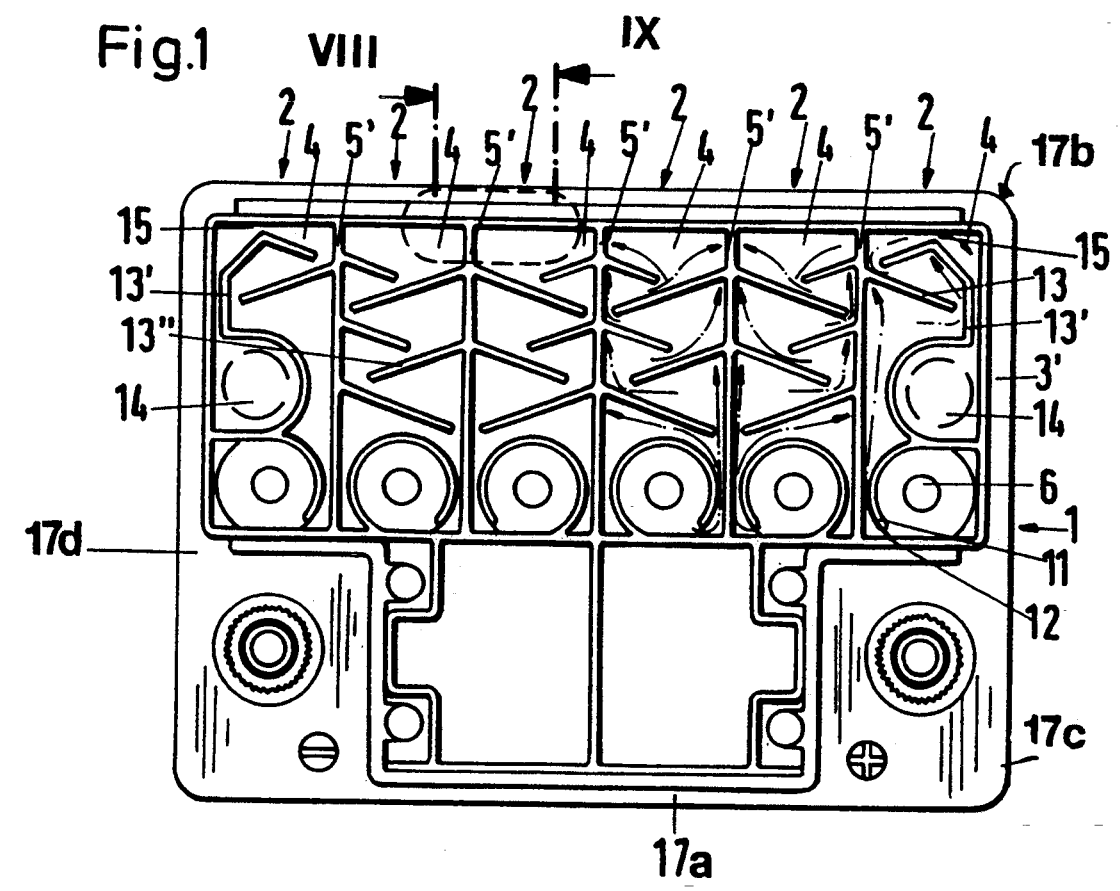
FIG. 1 shows a lead accumulator in a plan view, whereby the upper lid is removed and the lower lid is visible.

The lead accumulator according to the present invention is primarily characterized by:

A housing with a front side, a backside, a first and a second end face, and a bottom, the housing having a plurality of cells containing acid;

A lid for closing the housing, the lid comprising an upper lid and a lower lid spaced from the upper lid to define a space therebetween, the space being divided by chamber walls into a plurality of chambers such that each cell registers with a corresponding one of the chambers within the lid;

The lid having for each cell a fill and a check opening closable by a stopper;

Each chamber having guides for controlling a flow of acid, the guides comprising deflecting stays and an annular stay surrounding the fill and check opening, the annular stay having a degassing and return outlet;

The lid further having at least one ignition protector; and

The guides designed and arranged such that in any position of the housing, when resting on one of the end faces, front side and backside, acid within the chambers remains below a level above which acid flows into the ignition protector.

Preferably, the degassing and return outlet, when the lead accumulator is resting on the backside, is at a highest point of the annular stay.

Advantageously, the ignition protector is substantially in a center of the chamber and the fill and check opening is located in a peripheral zone of the chamber.

Expediently, the degassing and return outlet of the annular stay is within the area of the chamber.

In a preferred embodiment of the present invention, the degassing and return outlet of the annular stay is defined by a free end of the annular stay and a neighboring one of the chamber walls. Preferably, one of the deflecting stays is connected to the neighboring chamber wall and extends toward an opposite one of the chamber walls so as to form a passage between a free end of the deflecting stay and the opposite chamber wall.

Preferably, one deflecting stay encloses the ignition protector and has a free end delimiting a passage that is arranged diametrically opposed to the degassing and return outlet.

Expediently, the lid further comprises chamber connecting openings for connecting the chambers, the connecting openings arranged opposite the fill and check openings. Advantageously, the chamber connecting openings are positioned within the upper lid remote from the fill and check opening and adjacent to an outer edge of the upper lid. The chamber connecting openings provide a degassing passageway for gases within the lead accumulator. Preferably, the lid further comprises deflectors connected within the chambers for deflecting a flow of gas to the ignition protector from a horizontal orientation to undergo multiple vertical deflections. Preferably, the deflectors are vertical baffle plates connected to the upper lid and the chamber connecting openings are cutouts in the chamber walls.

A lead accumulator according to the present invention has the advantage that the ignition protector is protected from the acid and the acid cannot leak via the degassing channel from the battery within a certain time period. No matter how the housing is tilted or turned, the acid, due to the special arrangement and construction of the degassing and return outlets as well as the guides, is retained so that no acid can flow into the ignition protector. The zenith is defined by the constructive limitation of the ignition protector, for example, in the form of a corresponding stay which surrounds the ignition protector. The entrance to the passageway which leads to the ignition protector is thus to be provided at a level that is above the acid filling level of the respective chamber within the lid.

Preferably, the annular stay has one single degassing and return outlet. Accordingly, there is only one possibility provided for the acid to flow from the area of the fill and check opening into the chamber. Of course, the degassing and return outlet must be dimensioned such that the degassing and the subsequent return of the condensed acid can take place without hindrance.

In an expedient embodiment of the invention, it is further suggested that the ignition protector is arranged substantially in the center of the chamber and the fill and check opening is provided within the peripheral zone of the chamber. In the position in which the ignition protector is located on top and the fill and check opening is located at the bottom, it is thus ensured that no acid can flow into the ignition protector.

According to a further embodiment, it is suggested that the degassing and return outlet of the annular stay is positioned within the corner areas of the chamber. With this arrangement, the degassing and return outlet will be positioned in an upper corner for two of the turned positions. Due to a corresponding embodiment of the annular stay, the acid is retained within the interior space enclosed by the annular stay and therefore cannot flow downward in the direction toward the ignition protector.

According to a further expedient embodiment of the invention, the degassing and return outlet of the annular stay is formed by the free end of the annular stay and an adjacent chamber wall. This ensures that the degassing and return outlet assumes a position which is as far as possible upwardly located.

In another embodiment it is suggested that one of the deflecting stays is connected to the chamber wall which delimits the degassing and return outlet of the annular stay and is oriented such that it faces the oppositely arranged chamber wall so that the free end of the deflecting stay forms a passage with this chamber wall. It is thus ensured that in a turned or tilted position of the housing in which the degassing and return opening is positioned at a lower corner, the acid emerging from the degassing and return opening is retained by this specially designed deflecting stay.

Another embodiment suggests that the deflecting stay surrounding the ignition protector has a free end which delimits a passage that is substantially diametrically oppositely arranged to the degassing and return outlet. With this constructive embodiment it is ensured that in certain turned or tilted positions the passageway from the degassing and return opening to the passage of the ignition protector is long and slanted upwardly so that the acid cannot follow this passage.

In another embodiment of the present invention it is suggested that the cells, respectively, the chambers are connected to one another by chamber connecting openings provided at a side of the chamber opposite to the fill and check opening whereby preferably these chamber connecting openings are provided in the upper lid and are positioned remote from the fill and check opening in the vicinity to the outer lid edge. Chamber connecting openings embodied in the aforementioned manner ensure that the cells can be properly degassed, whereby the gas is preferably guided past an ignition protector provided at the end of the housing, and, on the other hand, it is ensured that in none of the possible tilted or turned positions acid can flow from one cell into another.

It is furthermore suggested that the degassing passageway provided by the chamber connecting openings for the flowing gases is provided with additional deflectors. These additional deflectors force the stream of gas on its way to the ignition protector, respectively, degassing channel to be deflected from a horizontal movement and to undergo multiple vertical deflections. Accordingly, in addition to the known horizontal labyrinth effect, a vertical additional labyrinth effect is provided which improves the acid precipitation, respectively, the drying of the gas.

DESCRIPTION OF THE PREFERRED EMBODIMENTS

The present invention will now be described in detail with the aid of several specific embodiments utilizing FIGS. 1 through 9.

The lead accumulator is comprised of a housing 1 made of thermoplastic material. The housing 1 comprises a total of six cells 2 which are arranged in single file. The housing 1 is open in the upward direction and is closed by a lid 3 which is also comprised of thermoplastic material. This lid 3 is comprised of a lower lid 3' and an upper lid 3" (see FIGS. 8 and 9) in the form of a cap-like closure cover which lid 3 is represented in detail in FIG. 7. The upper lid 3" is fused to the lower lid 3', which, in turn, is fused to the housing 1 in a sealing manner.

Figures 5, 6:
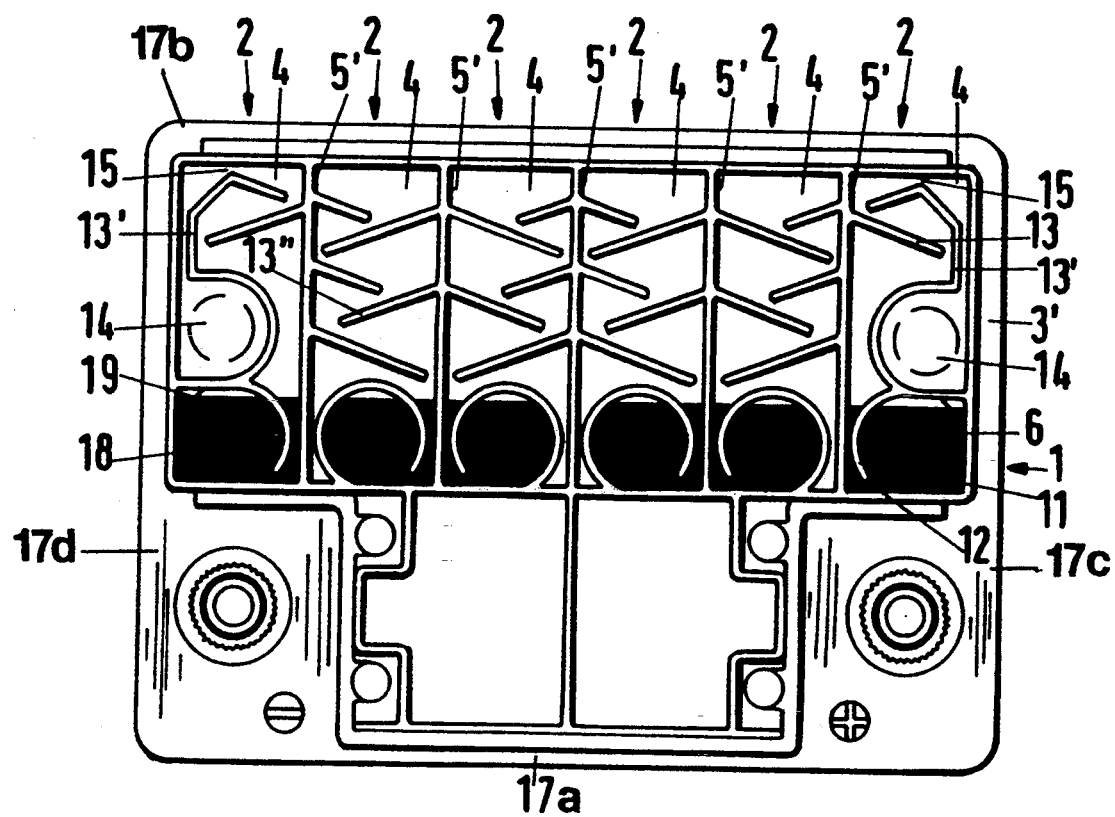
FIG. 5 shows an enlarged sectional view in the area of the fill and check opening after the lead accumulator has been turned upside down.
FIG. 6 shows the lead accumulator in a side view resting on its front side.

Corresponding to the total of six cells 2 the lid 3 is provided with six chambers 4 which are delimited by chamber walls 5' and 5". These chamber walls 5' and 5" are formed by corresponding elements within the lower lid 3' as well as within the upper lid 3", as can be seen in general in FIG. 5. The chamber walls 5 of the upper lid 3" are provided with slotted holes 16 which allow for the removal of acid vapors. In the area of each cell 2 the lower lid 3' is provided with a fill and check opening 6 that is funnel-shaped whereby a pipe socket 7 is penetrating into the interior of the chamber 4. However, it is also possible to omit the pipe socket 7 so that only the opening 6 remains within the lower lid 3'. As can be seen in FIG. 5, the upper lid 3" is provided with a peripheral sealing lip 8 within the area of the fill and check opening 6 for sealingly connecting the upper and the lower lids 3', 3". Each sealing lip 8 is provided with openings 9 distributed over its circumference. The fill and check openings 6 of the lid 3 can be closed by a stopper 10.

The fill and check opening 6 is surrounded by an annular stay 11 which with its free end defines a degassing and return outlet 12 together with the chamber wall 5'. Furthermore, the chamber 4 is provided with special deflecting stays 13 which form, on the one hand, a labyrinth for acid precipitation and, on the other hand, provide an acid retaining system.

Figure 7:
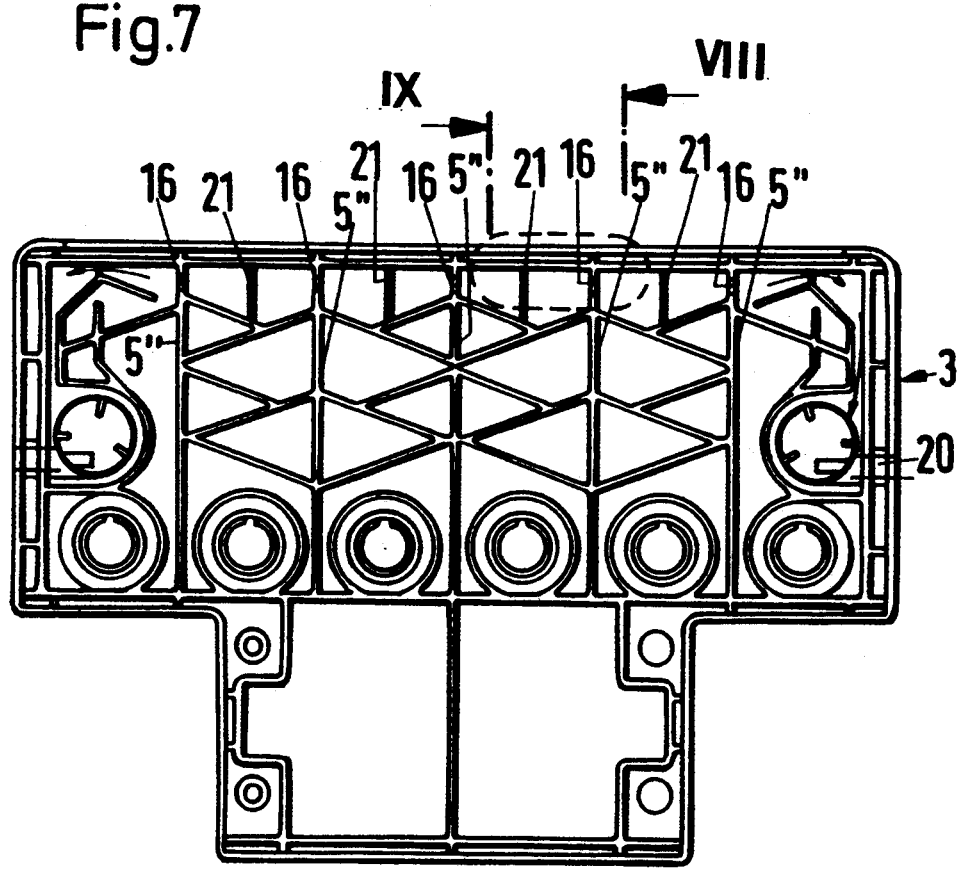
FIG. 7 shows the interior of the lid.
Figure 8:
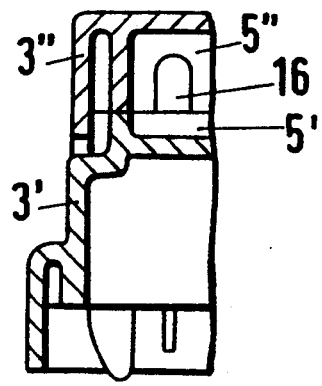
FIG. 8 shows a vertical section according to the line VIII—VIII in FIGS. 1 and 7 through the entire lid.
Figure 9:
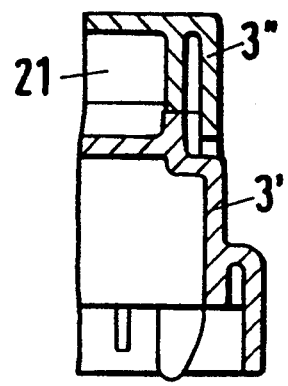
FIG. 9 shows a vertical section along the line IX—IX in FIGS. 1 and 7 through the entire lid.

On both ends of the lid 3 an ignition protector 14 is arranged, each is delimited by a specially designed deflecting stay 13'. This deflecting stay 13' with its free end delimits together with the chamber wall 5' a passage 15. The chamber walls 5' of neighboring chambers 4 are provided with chamber connecting openings in the form of the aforementioned slotted holes 16, as can be seen in FIGS. 7 and 8. The advantages of lead accumulators designed according to the present invention will be explained in the following with the aid of various turned positions.

FIG. 1 shows a plan view of the lead accumulator from which the position of the frontside, the backside and the two end faces can be taken.

Figure 2:
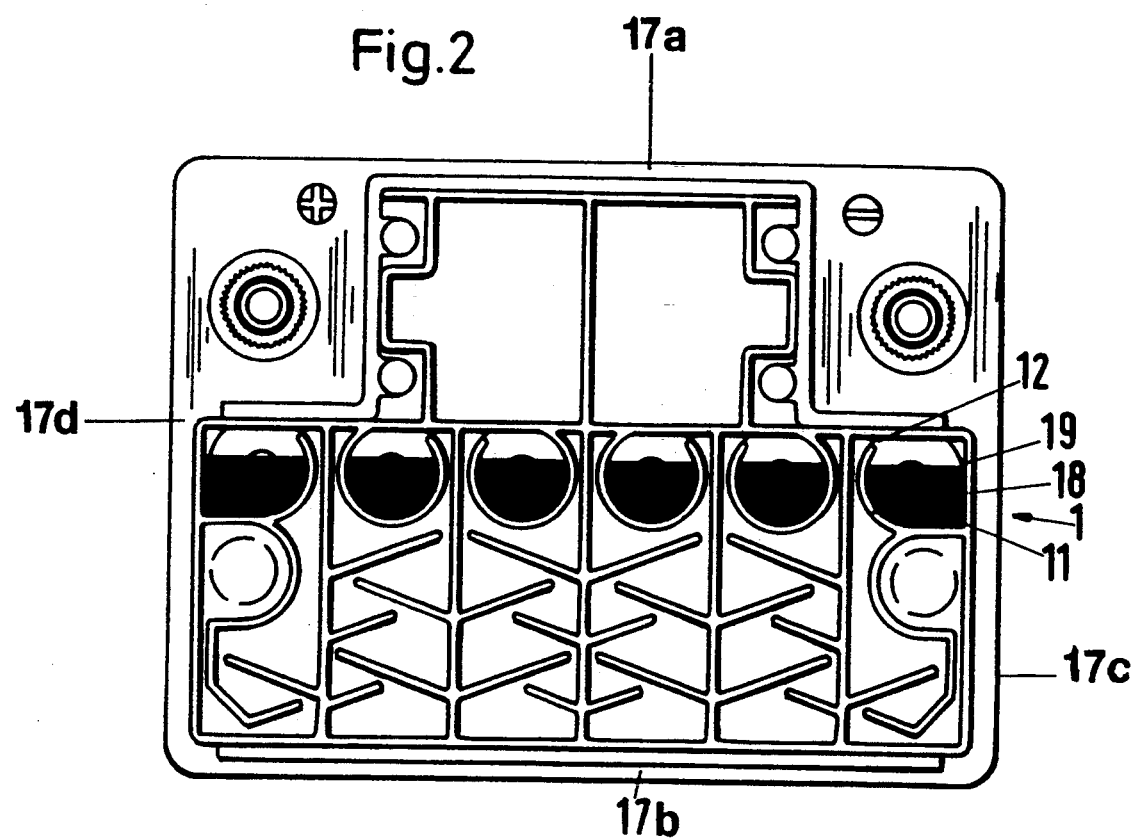
FIG. 2 shows a side view of the lead accumulator which is resting on its backside.

FIG. 2 shows the turned lead accumulator resting on the backside 17b of the housing 1. In this turned position, the fill and control opening 6 is located above the ignition protector 14 so that theoretically acid 18 from the fill and check opening 6 could flow into the ignition protector 14 arranged below. Due to the special embodiment of the annular stay 11 and especially due to the arrangement of the degassing and return outlet 12 within the upper edge portion the acid 18 collects within the annular stay 11 to the indicated level and is prevented from flowing downwardly for a limited amount of time.

Figure 3:
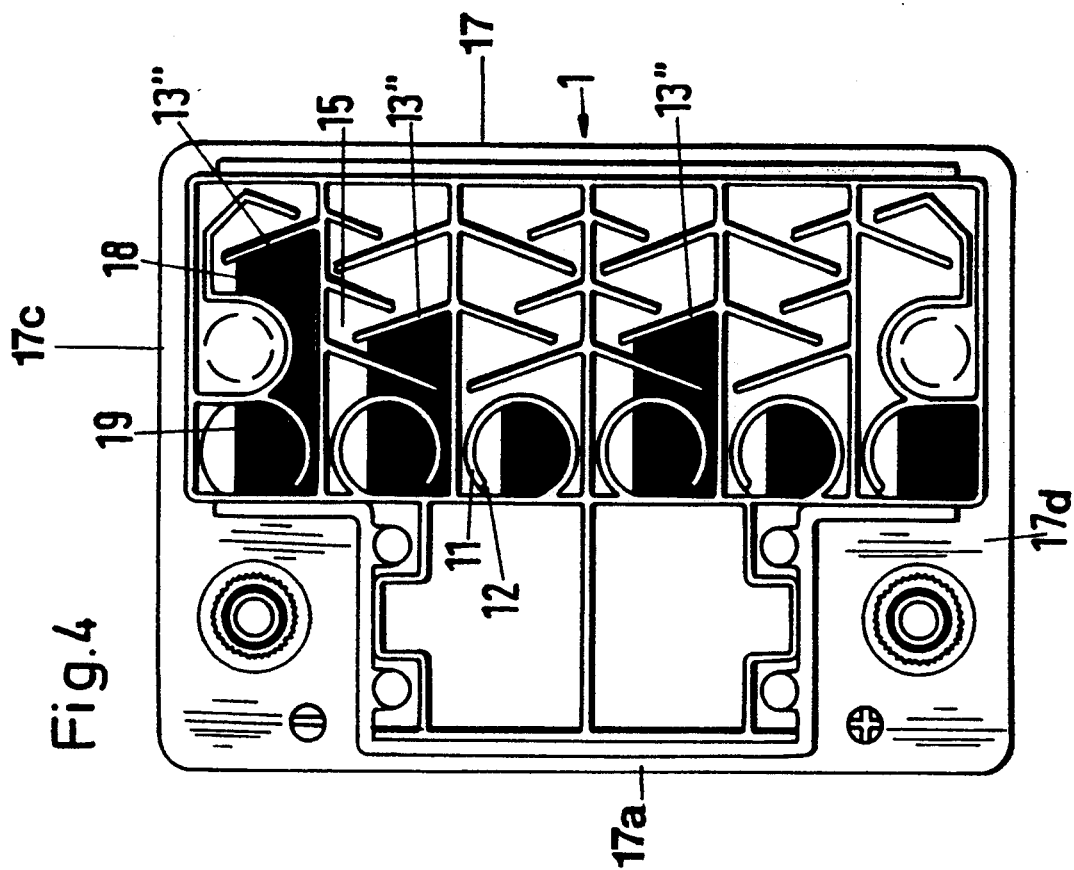
FIG. 3 shows a side view of the lead accumulator which is resting on the end face adjacent to the minus pole.
Figure 4:
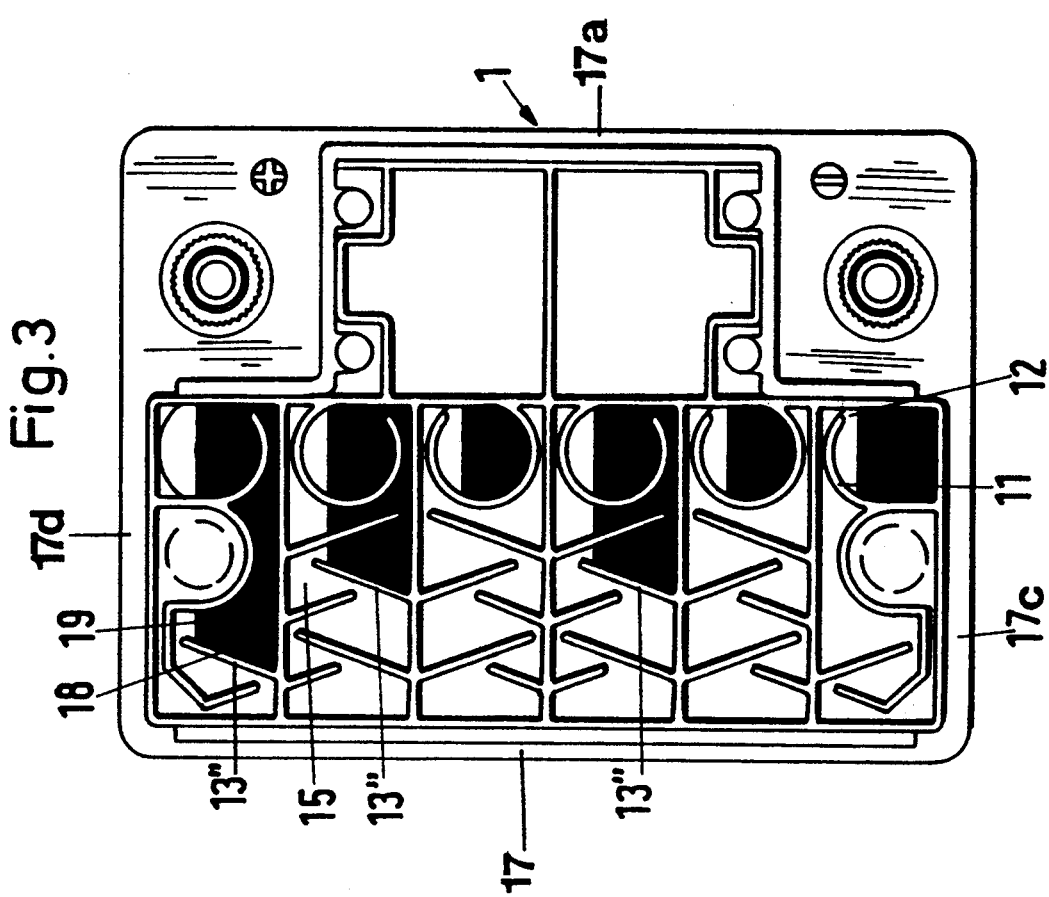
FIG. 4 shows a side view of the lead accumulator resting on the end face adjacent to the plus pole.

FIG. 3 shows the turned housing resting on the end face 17c of the minus pole. When the degassing and return opening 12 within the annular stays 11 is located at the right upper corner of the respective chamber 4, the acid 18 is retained within the annular stay 11. When the degassing and return outlets 12 are positioned at the right lower corner, the acid 18 can flow and, theoretically, reach the lower ignition protector 14 through the chamber connecting openings 16. However, this is prevented by the specially designed deflecting stays 13". These deflecting stays 13" extend from the chamber wall 5 were the degassing and return outlet 12 is located and extend upwardly so that the thus designed deflecting stays 13" provide a retaining means for the acid 18. A similar situation is shown in the oppositely turned accumulator represented in FIG. 4 where the housing 1 rests on the end face 17d of the plus pole. The deflecting stays 13" prevent the acid 18 from flowing downwardly where the degassing and return outlets 12 are positioned at the left lower corner.

FIG. 6 shows the lead accumulator resting on its front side. The horizontal cross hatching indicates the acid which by turning the housing flows from the respective fill and check openings 6 via the openings 9 in the sealing lip 8 into the chamber 4. The upper acid level 19 is indicated. It can be seen that the space delimited by the annular stay 11 is almost entirely filled with acid 18. The acid level 19 is lower than the level of the ignition protector 14 so that there is no risk of acid 18 entering the ignition protector 14 or the degassing channel 20 and thereby reach the outside of the accumulator.

In summarizing the above, in all of the aforedescribed turned positions acid 18 cannot flow into the ignition protector 14 and into the degassing channel 20 to thereby leak from the accumulator. The ignition protector 14 is thus never wetted with acid 18 and thereby the leakage of acid 18, for example, into the engine compartment of a vehicle, is thus reliably prevented for a certain amount of time. A time period of, for example, 20 hours in a (turned) lateral position and 1 hour in a tilted position until acid leakage is observed, depends on the geometric and constructive design of the lid, especially on the number of the provided inner horizontal and vertical labyrinth deflecting stays, on the construction of the annular stays, and on the number, size, and material of the ignition protectors 14.

This tilting safety device is especially required for automated handling by robots and automotive transport. The constructive details as illustrated in the drawings but not described, all represent features pertinent to the invention.

The present invention is, of course, in no way restricted to the specific disclosure of the specification and drawings, but also encompasses any modifications within the scope of the appended claims.

What we claim is:

1. A lead accumulator comprising:
a housing with a front side, a backside, a first and a second end faces, and a bottom, said housing having a plurality of cells containing acid;
a lid for closing said housing, said lid comprising an upper lid and a lower lid spaced from said upper lid to define a space therebetween, said space being divided by chamber walls into a plurality of chambers such that each said cell registers with a corresponding one of said chambers within said lid;
said lid having for each said cell a fill and check opening closable by a stopper;
each said chamber having guides for controlling a flow of acid, said guides comprising deflecting stays and an annular stay surrounding said fill and check opening, said annular stay having a degassing and return outlet;
said lid further having at least one ignition protector;
said guides designed and arranged such that in any position of said housing, when resting on one of said end faces, front side, and backside, acid within said chambers remains below a level above which acid flows into said ignition protector; and
wherein said degassing and return outlet, when said lead accumulator is resting on said backside, is at a highest point of said annular stay.

2. A lead accumulator according to claim 1, wherein said at least one ignition protector is arranged substantially in a center of one said chamber located adjacent to one of said first and second end faces and said fill and check opening is located in a peripheral zone of said one chamber.

3. A lead accumulator according to claim 1, wherein said degassing and return outlet of said annular stay is within the area of said chamber.

4. A lead accumulator according to claim 1, wherein said degassing and return outlet of said annular stay is defined by a free end of said annular stay and a neighboring one of said chamber walls.

5. A lead accumulator according to claim 4, wherein one said deflecting stay is connected to said neighboring chamber wall and extends toward an opposite one of said chamber walls so as to form a passage between a free end of said deflecting stay and said opposite chamber wall.

6. A lead accumulator according to claim 1, wherein one said deflecting stay encloses said ignition protector and has a free end delimiting a passage that is arranged diametrically opposed to said degassing and return outlet.

7. A lead accumulator according to claim 1, wherein said lid further comprises chamber connecting openings for connecting said chambers, said chamber connecting openings arranged opposite said fill and check openings.

8. A lead accumulator according to claim 7, wherein said chamber connecting openings are positioned within said upper lid remote from said fill and check opening adjacent to an outer edge of said upper lid.

9. A lead accumulator according to claim 7, wherein said chamber connecting openings provide a degassing passageway for gases within said lead accumulator and wherein said lid further comprises deflectors connected within said chambers for deflecting a flow of gas to said ignition protector from a horizontal orientation to undergo multiple vertical deflections.

10. A lead accumulator according to claim 9, wherein said deflectors are vertical baffle plates connected to said upper lid and wherein said chamber connecting openings are cutouts in said chamber walls.

* * * * *